United States Patent
Clemm et al.

(10) Patent No.: US 9,535,687 B2
(45) Date of Patent: Jan. 3, 2017

(54) AUDITED BUILDS BASED UPON SEPARATE CLASS DEPENDENCY RECORDS

(75) Inventors: Geoffrey M. Clemm, Concord, MA (US); Bryan P. Douros, Framingham, MA (US); Steven T. Rehrauer, Waltham, MA (US)

(73) Assignee: International Business Machines Corporation, Armonk, NY (US)

( * ) Notice: Subject to any disclaimer, the term of this patent is extended or adjusted under 35 U.S.C. 154(b) by 1436 days.

(21) Appl. No.: 11/139,403

(22) Filed: May 27, 2005

(65) Prior Publication Data

US 2005/0268283 A1    Dec. 1, 2005

Related U.S. Application Data

(60) Provisional application No. 60/574,893, filed on May 27, 2004.

(51) Int. Cl.
*G06F 9/44* (2006.01)

(52) U.S. Cl.
CPC ..................... *G06F 8/71* (2013.01)

(58) Field of Classification Search
USPC ............. 717/120–121, 136–137, 140–148
See application file for complete search history.

(56) References Cited

U.S. PATENT DOCUMENTS

| | | | | |
|---|---|---|---|---|
| 5,408,665 A | * | 4/1995 | Fitzgerald | 717/163 |
| 5,649,200 A | * | 7/1997 | Leblang et al. | 717/122 |
| 5,659,735 A | * | 8/1997 | Parrish et al. | 717/121 |
| 5,675,802 A | * | 10/1997 | Allen et al. | 717/103 |
| 6,003,042 A | * | 12/1999 | Melahn | 717/122 |
| 6,205,576 B1 | * | 3/2001 | Rajala et al. | 717/120 |
| 6,370,681 B1 | * | 4/2002 | Dellarocas | G06F 8/20 717/110 |
| 7,962,590 B1 | * | 6/2011 | Or | G06F 8/24 709/223 |
| 2003/0037313 A1 | * | 2/2003 | Halpern et al. | 717/120 |
| 2004/0103393 A1 | * | 5/2004 | Reddy et al. | 717/122 |
| 2005/0262482 A1 | * | 11/2005 | Wagner | G06F 8/71 717/120 |
| 2006/0010425 A1 | * | 1/2006 | Willadsen et al. | 717/120 |

OTHER PUBLICATIONS

*Creating a Release Area*; Installation Guide: Rational ClearCase; pp. 31-42.
*Software Configuration Management for Project Leaders*; ACQ, Software Quality Professional; vol. 2, Issue 4, Sep. 2000.
*CASEVision/ClearCase Concepts Guide*; Document No. 007-1612-020.

* cited by examiner

*Primary Examiner* — Ryan Coyer
(74) *Attorney, Agent, or Firm* — Steven M. Greenberg, Esq.; CRGO Law

(57) ABSTRACT

Embodiments of the present invention address deficiencies of the art in respect to software configuration management and provide a method, system and apparatus for producing audited builds based on separate class dependency records. In one embodiment, a software configuration management tool can be provided which can include build-audit logic programmed to produce separate configuration records for each target object in a build. Each configuration record can include a direct dependency reference for a corresponding target object. Moreover, each configuration record can include version information for a corresponding target object. Finally, the software configuration management tool can include a versioned object base storing different versions of source files and derived objects built from the source files.

15 Claims, 2 Drawing Sheets

AUDITED BUILDS BASED UPON SEPARATE CLASS DEPENDENCY RECORDS

CROSS-REFERENCE TO RELATED APPLICATIONS

This patent application claims the benefit under 35 U.S.C. §119(e) of presently pending U.S. Provisional Patent Application 60/574,893, entitled AUDITED BUILDS FOR JAVA COMPONENTS BASED ON CLASS DEPENDENCIES, filed on May 27, 2004, the entire teachings of which are incorporated herein by reference.

BACKGROUND OF THE INVENTION

Field of the Invention

The present invention relates to the field of computer aided software engineering and more particularly to build-auditing in a software configuration management tool.

Description of the Related Art

When building computer software, change happens often. Due to the oft-occurring changes in the software development process, software developers have gravitated towards the use of software configuration management tools. Software configuration management refers to the set of activities that are designed to control change by identifying the work product in a software development cycle which is most likely to change, establishing relationships among the identified work product, defining mechanisms for managing different versions of the identified work product, controlling changes that are imposed upon the work product, and auditing and reporting the changes.

A software configuration management system can provide its users both with the ability to record every detail of components used in a software build, and also with the ability to completely recreate the build environment. This requires the software configuration management system to generate a completely accurate software bill-of-materials for a software build. Additionally, the software configuration management system must be able to free the user from the need to manually maintain and declare most build dependencies in order to improve build accuracy and development productivity.

To meet the foregoing characteristics of a software configuration management system, conventional software configuration management systems often perform file-system level auditing. File-system level auditing allows the software configuration management system to capture and record a complete set of configuration information for every software build. File-system level auditing heretofore represents the only known way of supporting complete rebuildability and maintainability. The resulting configuration records can answer critical questions such as, "Has the corrected version of the source code of a particular module been incorporated into the new release?", "What has changed in between releases?" and, "Which version of the compiler built the source code for a particular module?".

The build-auditing feature of at least one conventional software configuration management system provides build avoidance during a build of a software product. Build-avoidance refers to the ability to avoid a complete build of a software product where individual modules do not require re-compilation and where the objects of a prior build can be re-used in subsequent build operations. Build-avoidance generally operates by tracking the results of earlier builds through the observation of file-reads. Through observing file-reads, it can be determined whether the results of an earlier build can be reused. In doing this, the build-audit process can account both for changes in source dependencies and also in prior updates to targets in a build referred to as build dependencies.

Build-avoidance technologies at their core account for traditional compilers for third generation languages. In a traditional setting, individual source code modules can be compiled to produce corresponding compiled objects which in turn can be linked and built into a target application. Generally, traditional compiler-linker-builders do not perform dependency checking during the build phase. At best, configuration files for a module can be consulted to ensure that a dependency has been declared albeit the ultimate presence of the dependency cannot be assured. Thus, the build-audit process of software configuration management tools can perform dependency checking on behalf of the compiler-linker-builder.

Unlike traditional third-generation languages, modern programming languages such as the Java programming language provide a traditional compilation process to produce an interpretable target. In the Java programming environment, dependency checking occurs as a matter of course during the build phase. Hence, the dependency checking functionality of an audit-build feature at best can be viewed as redundant and at worst can conflict with the operation of the Java compiler. To wit, the audit-build feature of a conventional software configuration management tool often will rebuild targets which are current and could be safely reused. This, in turn, can result in the inefficient building of Java components.

BRIEF SUMMARY OF THE INVENTION

Embodiments of the present invention address deficiencies of the art in respect to software configuration management and provide a novel and non-obvious method, system and apparatus for producing audited builds based on separate class dependency records. In one embodiment, a software configuration management tool can be provided which can include build-audit logic programmed to produce separate configuration records for each target object in a build. Each configuration record can include a direct dependency reference for a corresponding target object. Moreover, each configuration record can include version information for a corresponding target object. Finally, the software configuration management tool can include a versioned object base storing different versions of source files and derived objects built from the source files.

In another embodiment, a build-audit method can be provided which can include determining direct dependencies for a target object in a build, writing the determined direct dependencies to a configuration record corresponding to the target object, and repeating the determining and writing steps for other target objects in the build. Specifically, each repeat performance of the writing step can produce a different configuration record. The method also can include retrieving the target object from a versioned object base according to a selection criteria such as a version specified for a set of target objects in the versioned object base. Finally, the method can include performing an audited build of the target objects using different configuration records for each of the target objects to determine whether an existing target object can be re-used in the audited build.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, data processing system and computer program product for audited builds based on separate class dependency records. In accordance with an embodiment of the present invention, heuristics can be used to detect class dependencies in an audited build. The detected class dependencies can be recorded in a place which augments a makefile for subsequent executions of the build-audit tool. For example, the detected class dependencies can be stored in a configuration record closely associated with the makefile target.

In this regard, one or more direct dependencies for each class can be stored separately from each other set of direct dependencies for other classes so that each class is treated as a separate build target. Moreover, record versions rather than timestamps can be utilized in determining whether or not to rebuild a target implicated by dependency data for another class. In this way, when building an application based upon multiple Java components using a software configuration manager, the building of the Java components need not result in unnecessary rebuilds responsive to the use of dynamic views in the software configuration management system.

Figure 1:
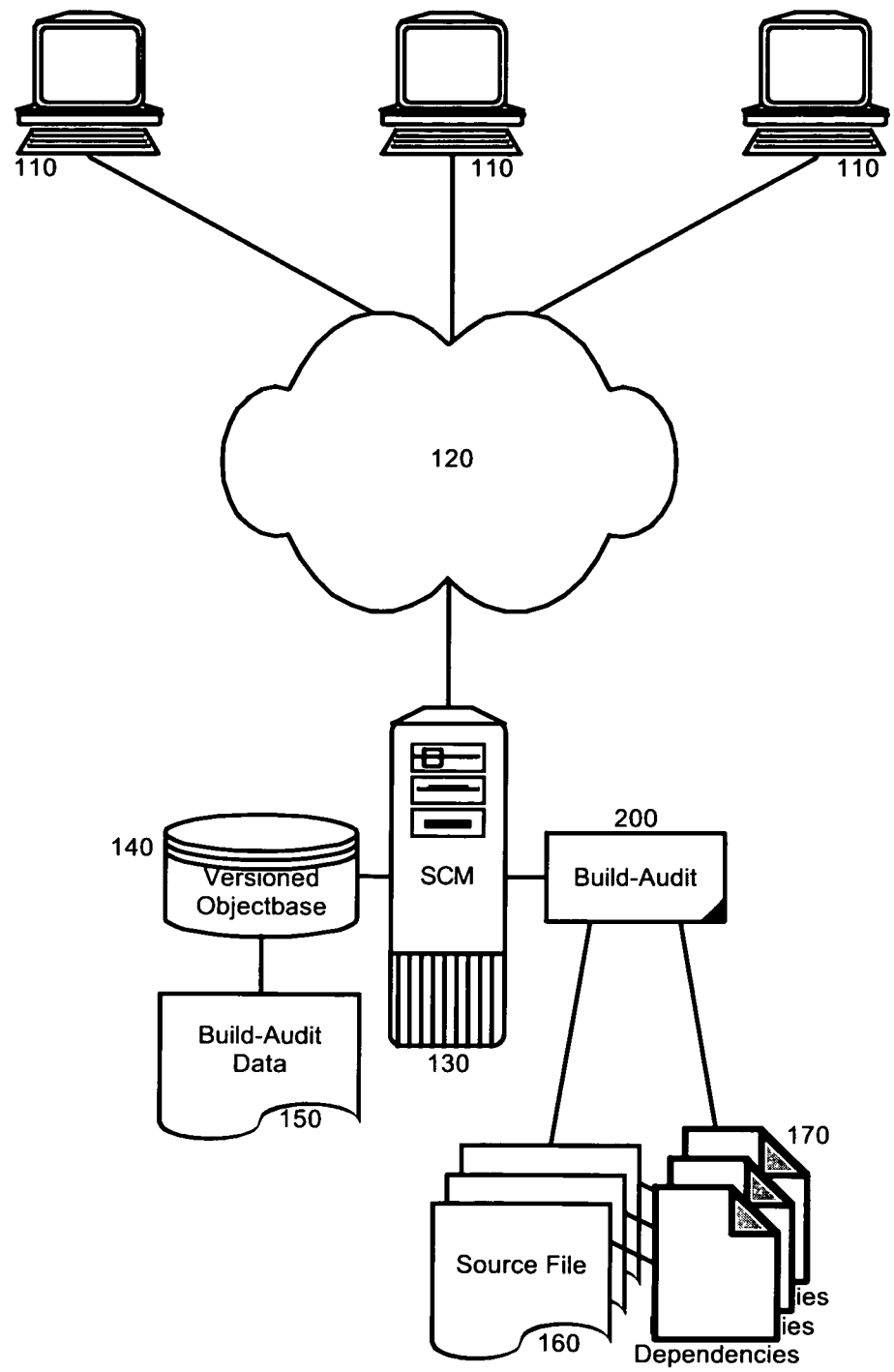
FIG. 1 is a schematic illustration of a data processing system configured to produce audited-builds for Java components based upon class dependencies; and, FIG. 2 is a flow chart illustrating a process for producing audited builds based upon separate class dependency records.

In further illustration, FIG. 1 is a schematic illustration of a data processing system configured to produce audited builds based on separate class dependency records. The data processing system can include a software configuration management tool 130 such as the IBM Rational® ClearCase® software configuration management tool. Optionally, the software configuration management tool 130 can be configured for coupling to one or more development clients 110 over a computer communications network 120.

The software configuration management tool 130 can include a versioned object base 140. The versioned object base 140 can be a permanent, secure data repository. Specifically, the versioned object base 140 can contain data that is shared by all users which can include current and historical versions of source files, along with derived objects built from the sources by compilers, linkers, and so on. In addition, the repository can store detailed accounting data 150 on the development process itself: who created a particular version and when the particular version had been created, and why the particular version had been created, what versions of sources were used in a particular build, and other relevant information.

In accordance with an embodiment of the present invention, build-audit logic 200 can be coupled to the software configuration management tool 130. The build-audit logic 200 can write dependency data 170 for targets produced by corresponding source files 160. Specifically, the operation of the make logic for the software configuration management tool 130 can be extended to avoid unnecessary rebuilds by not assuming a single target resulting from the execution of a build command. Rather, build-audit logic 200 can be configured to handle separate dependency data 170 for each object in an application resulting from a build of the source files 160.

Figure 2:
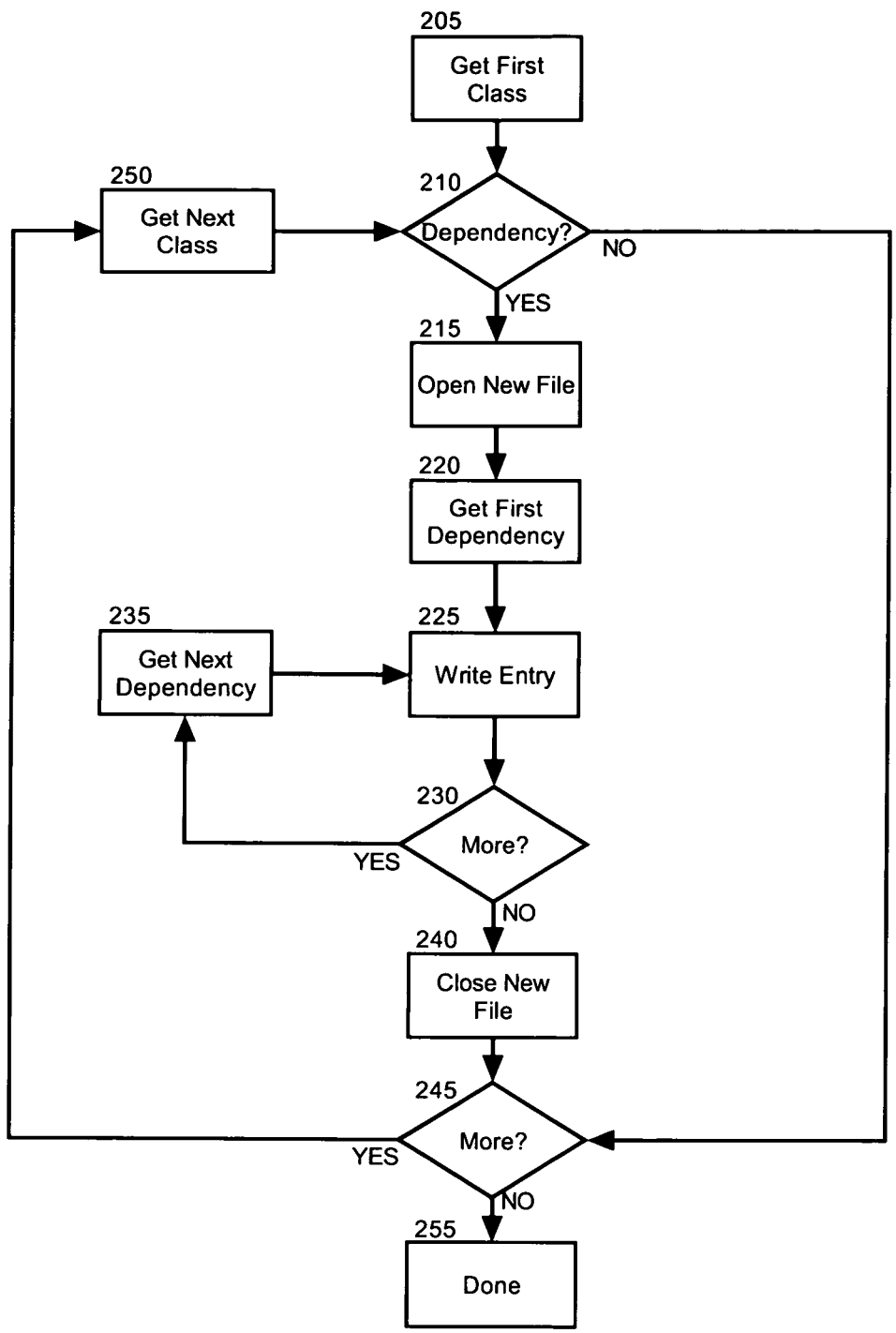

In further illustration, FIG. 2 is a flow chart illustrating a process for producing audited builds based on separate class dependency records. Beginning in block 205, a first target object produced from a class for use in an application build can be retrieved for processing. In decision block 210, it can be determined whether the class is dependent upon at least one other class having an associated target object. If so, in block 215 a new configuration record, for example a separate dependency file, can be created and information for the first dependency can be retrieved in block 220. In block 225, the retrieved dependency information can be written to the dependency file.

In decision block 230, it can be determined whether additional dependencies can be identified for the first target object. If so, in block 235, information for the additional dependency can be retrieved. Subsequently, as before, in block 225, the retrieved dependency information can be written to the dependency file. The process can continue again in decision block 230 where it can be determined whether additional dependencies can be identified for the first target object. When no more additional dependencies can be identified for the first target object, in block 240 the dependency file can be closed for the first retrieved target object.

In decision block 245, it can be determined whether additional target objects remain to be processed for the application build. If so, in block 250 a next target object can be retrieved and the process can continue through decision block 210 in which it can be determined whether the next target object includes a direct dependency upon another class in another target object. Again, if so the process can continue through blocks 215 through 250. Otherwise, it can be determined in decision block 245 once again whether further target objects remain to be processed for the application build. If not, the process can end in block 255.

Utilizing the separately produced dependency files for each target object produced through the process of FIG. 2, and further utilizing the tracking of version records for target objects rather than timestamps, the software configuration management tool can produce efficient builds for different versions of an application without regard to when a particular target objection referenced by the build had been produced.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A data processing system configured to produce audited builds based on separate class dependency records, the system comprising:
   software configuration management tool executing in memory of a computer and coupled to a versioned object base; and,
   build-audit logic coupled to the software configuration management tool, the logic comprising program code programmed upon execution in the memory of the computer to detect class dependencies for other classes in an audited build, to store the class dependencies for other classes separately from one another in a corresponding separately stored configuration record comprising a separate dependency file associated with a makefile target, each of the separately stored class dependencies for other classes being treated as a separate build target.

2. The system of claim 1, wherein the versioned object base stores different versions of source files and derived objects built from said source files.

3. The system of claim 1, wherein each of said configuration records comprises version information for a corresponding target object.

4. The system of claim 1, wherein each said configuration record comprises a direct dependency reference for a corresponding target object.

5. The system of claim 1, wherein each target object in said build is a Java component.

6. A build-audit method comprising the steps of:
   determining direct dependencies for a target object in a build in memory of a computer;
   writing said determined direct dependencies by a processor of the computer to a configuration record comprising a separate dependency file associated with a makefile and corresponding to said target object; and,
   repeating in said computer said determining and writing steps for other target objects in said build wherein each repeat performance of said writing step produces a different configuration record file associated with the makefile each different configuration record being separately stored and associated with different class dependencies for other classes for the target object.

7. The method of claim 6, further comprising the steps of retrieving said target object from a versioned object base according to a selection criteria specified for a set of target objects in said versioned object base.

8. The method of claim 7, wherein said retrieving step comprises the step of retrieving said target object from said versioned object base according to a specified version of said set of target objects in said versioned object base.

9. The method of claim 6, further comprising the step of performing an audited build of said target objects using different configuration records for each of said target objects to determine whether an existing target object can be re-used in said audited build.

10. The method of claim 6, wherein said configuration records are separate configuration files.

11. A computer program product comprising a non-transitory computer usable memory device comprising computer usable program code for build-auditing, said computer program product including;
    computer usable code for determining direct dependencies for a target object in a build;
    computer usable code for writing said determined direct dependencies to a configuration record comprising a separate dependency file associated with a makefile and corresponding to said target object; and,
    computer usable code for repeating said determining and said writing for other target objects in said build wherein each repeat performance of said writing step produces a different configuration record associated with the makefile each different configuration record being separately stored and associated with different class dependencies for other classes for the target object.

12. The computer program product of claim 11, further comprising computer usable code for retrieving said target object from a versioned object base according to a selection criteria specified for a set of target objects in said versioned object base.

13. The computer program product of claim 12, wherein said computer usable code for retrieving said target object from a versioned object base comprises computer usable code for retrieving said target object from said versioned object base according to a specified version of said set of target objects in said versioned object base.

14. The computer usable code of claim 11, further comprising computer usable code for performing an audited build of said target objects using different configuration records for each of said target objects to determine whether an existing target object can be re-used in said audited build.

15. The computer usable code of claim 11, wherein said configuration records are separate configuration files.

* * * * *